United States Patent [19]

Mattor et al.

[11] 4,166,150

[45] Aug. 28, 1979

[54] RELEASE SHEET WITH DRIED AND CURED COATING COMPOSITION

[75] Inventors: John A. Mattor, Bar Mills; Lawrence Price, Old Orchard Beach, both of Mass.

[73] Assignee: Scott Paper Company, Philadelphia, Pa.

[21] Appl. No.: 863,804

[22] Filed: Dec. 23, 1977

[51] Int. Cl.$^2$ ............................................... C09J 7/02
[52] U.S. Cl. ................................. 428/352; 428/454; 428/460; 428/461; 428/462; 428/463; 428/512; 428/513; 428/514; 428/531; 428/530; 428/526; 156/289; 427/385 R; 260/18 S; 260/19 R; 264/338; 260/29.40 A; 260/33.2 R
[58] Field of Search ............................. 428/512–514, 428/352, 530, 526, 531, 454, 460, 461–463

[56] References Cited

U.S. PATENT DOCUMENTS

| | | | |
|---|---|---|---|
| 3,690,924 | 9/1972 | Estes | 428/352 |
| 3,933,702 | 1/1976 | Caimi et al. | 428/352 X |
| 3,946,135 | 3/1976 | Peterson | 428/411 |

*Primary Examiner*—P. C. Ives
*Attorney, Agent, or Firm*—R. Duke Vickrey; John W. Kane, Jr.

[57] ABSTRACT

Disclosed is a release sheet having on at least one of its outer surfaces a dried and cured coating composition comprising a release agent, a cross-linkable thermoplastic resin, and a water dispersible organic compound containing polyoxyethylene, polyoxypropylene, or a block copolymer of polyoxyethylene and polyoxypropylene.

22 Claims, No Drawings

RELEASE SHEET WITH DRIED AND CURED COATING COMPOSITION

BACKGROUND OF THE INVENTION

1. Field of the Invention

The present invention relates to coatings for paper or other sheets or substrates, which are generally classified in the art as release coatings and are characterized by their ability to separate intact from a surface of material which is normally adherent or adhesive in nature. There are many applications for such release coatings ranging from packaging materials for tacky products, such as asphalt, to release papers for such uses as preparing heat and pressure consolidated decorative laminates.

2. Description of the Prior Art

The requirements for release coatings and release sheets may vary widely, depending upon the application in which they are to be employed. For example, a release sheet which is adequate for use as a packaging material may not satisfy the requirements necessary for a release sheet used in the casting of a thermoplastic film or sheet; and, similarly, a release sheet which is adequate for a casting application may not be suitable in a platen press application wherein high temperatures and/or pressures are employed to consolidate decorative laminates. This latter application places particularly demanding requirements on the release sheets.

Decorative laminates have found widespread acceptance as marresistant surfaces for wall-coverings, paneling, table tops, counter tops, vanities, and the like. These laminates are conventionally formed by consolidating several laminae under heat and pressure to form a unitary structure which usually carries on at least one of its surfaces a surface decoration which can range from something as simple as a solid color to something as complex as an embossed, simulated woodgrain finish.

Preparation of such laminates generally involves the use of one or more sheets of corestock in combination with a decorative or print sheet and, if desired, a top sheet or overlay. The corestock, if corestock is employed, usually comprises an unbleached kraft paper which has been impregnated with a relatively inexpensive thermosetting resin such as a phenolic resin, a polyester resin, and the like, which is easily cross-linked upon the application of heat and pressure during consolidation.

The decorative or print sheet and the overlay (if used) are both impregnated with a "noble" thermosetting resin (i.e. a resin which is also cross-linkable upon the application of the heat and pressure during consolidation, but which exhibits little or no color deterioration upon the application of such heat and pressure and which prevents any strike-through or "bleeding" of the thermosetting resin used in the corestock). Two of the most common "noble" thermosetting resins used to impregnate the decorative or print sheet employed in the preparation of such laminates are urea-formaldehyde resin condensates and melamine-formaldehyde resin condensates, although other resins such as polyester resins have also been employed as "noble" thermosetting resins for the impregnation of such sheets.

After consolidation, in those applications where the resulting laminate is intended to be used in a structural application, rather than merely for its decorative effect, the laminate is usually bonded to a substrate material such as plywood, hardboard, particle board, cement-asbestos board, and the like, to give it additional strength and rigidity for its intended structural use.

As indicated above, the various laminae employed to form the ultimate laminate are consolidated through the simultaneous application of heat and pressure between heated pressure platens. Such presses generally consist of two heavy, heated platens on the top and bottom of the press, with additional heated platens in between to provide the number of openings desired in the press. Each opening typically includes the following elements in the following order: (a) a heated platen, (b) one or more sheets of caul stock, which are primarily intended to distribute pressure uniformly over the surface of the caul plate, (c) a metal caul plate, (d) the opening itself, (e) another metal caul plate, (f) one or more sheets of caul stock, and (g) another heated platen. The various laminae which will form a laminate are placed together in the opening, sometimes alone and sometimes as a "book" or "pack" of laminates.

In order to prevent the decorative sheet or overlay sheet from adhering to the caul plate, and in some cases to also impart desired gloss or surface texture to the decorative sheet or overlay sheet, it is customary to employ a release sheet or liner between the print sheet or overlay sheet and the caul plate. The laminae material which is placed against the release sheet is typically an uncured amine formaldehyde resin, such as melamine formaldehyde resin condensate to urea formaldehyde resin condensate. Such materials have a strong tendency to react with and/or adhere to the surface of the release sheet, placing tough requirements upon the release sheet, which must resist adhering to the laminate. This difficult requirement is further complicated by the fact that different manufacturers use different laminate materials and different press temperatures and pressures. Furthermore, the variation in heating and cooling cycles occurring from laminate to laminate and edge to center in each laminate, even in a single pressing operation can result in variable release results.

A particularly satisfactory prior art release coating and release sheet for use with platen pressing of decorative laminates is disclosed in U.S. Pat. No. 3,946,135, issued to John O. H. Peterson on Mar. 23, 1976. This patent, which is herein incorporated by reference, discloses a release coating formulation comprising a release agent, a monomeric polyhydric alcohol and a cross-linkable thermosetting resin. The monomeric polyhydric alcohol cross-links with the cross-linkable thermosetting resin to form a particularly stable surface having a low level of reactance with and/or adherence to laminates used in panel pressing. However, the release sheets coated from the above-described formula are sometimes not entirely satisfactory from a release standpoint for use with all varieties of laminate materials and press conditions. Also, the release coating formulation, which is coated as an aqueous solution onto a paper substrate, is sometimes difficult to coat because of its low viscosity. Attempts to increase the viscosity by adding conventional thickener materials have generally been unsatisfactory because of their tendency to rapidly cross-link with the other materials in the formulation to increase the coating viscosity very quickly beyond that which is coatable, resulting in an unacceptably short pot life.

SUMMARY OF THE INVENTION

The present invention relates to a coating composition for use in the preparation of a release coating and release sheet which is particularly useful for panel pressing applications wherein decorative laminates are consolidated under heat and pressure. In some embodiments, the invention is an improved form of the release coating described and claimed in U.S. Pat. No. 3,946,135. The coating composition of the present invention comprises a release agent, a cross-linkable thermosetting resin, and a water dispersible organic compound containing polyoxyethylene, polyoxypropylene, or block copolymers of polyoxyethylene and polyoxypropylene. The coating composition is applied to the substrate in an aqueous form, so the organic compound must be water dispersible, and is preferably water soluble. A monomeric polyhydric alcohol is preferably included in the coating composition to cross-link with the thermosetting resin. However, it can be left out in cases where the organic compound provides the same function.

The water dispersible organic compound is preferably chosen from either

Class A.-polyoxyethylenated polyoxypropylenated ethylene diamine, such as the materials sold under the trademark Tetronics; or Class B.-a compound having the formula:

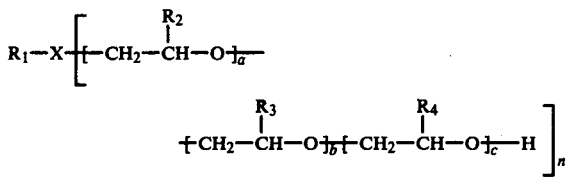

where

R$_1$ is hydrogen or an organic hydrophobe;

R$_2$, R$_3$, and R$_4$ are independently selected from H or CH$_3$—, and where R$_2$, R$_3$, and R$_4$ are all H, more than 50% of the molecular weight of the compound is provided by polyoxyethylene;

X is O, S, or N;

n=1 where X is O or S, n=2 where X is N; and a, b, and c are zero or integers, and the sum of a, b, and c is greater than 1.

One Class B type of organic compound is the type in which R$_1$, R$_2$, R$_3$, and R$_4$ are H, and X is O (polyoxyethylene), preferably where a+b+c is greater than 14 (mol. wt.=634).

Another Class B type of organic compound is the type in which R$_1$ is H; R$_2$, R$_3$, R$_4$ are CH$_3$-(polyoxypropylene), and a+b+c is preferably less than 25 (mol. wt.=1468), and more preferably greater that 4 (mol. wt.=250).

Another Class B type of organic compound is the type in which R$_1$, R$_2$ and R$_4$ is H; X are O; R$_3$ is CH$_3$—; and a; b and c are all integers (block copolymers of polyoxyethylene-polyoxypropylene-polyoxyethylene), preferably where 300>a+c>9 and 72>b>17.

Another Class B type of organic compound is the type in which R$_1$, R$_3$ is H; R$_2$, R$_4$ are CH$_3$—; X are O and a, b, c are all integers (block copolymers of polyoxypropylene-polyoxyethylene-polyoxypropylene), preferably where 55>a+c>17 and 250>b>74.

Another Class B type of organic compound is the type in which R$_1$ is an organic hydrophobe. Examples of such compounds include, but are not limited to, long-chain carboxylic acid esters of glycerol, polyoxyethylenated long-chain carboxylic acid esters of sorbitol or sorbitan, polyoxyethylenated fatty acids, polyoxyethylenated polyoxypropylenated fatty acids, polyoxyethylenated alkylphenols, and polyoxyethylenated alcohols.

Some of the above named materials will be recognized as conventional surfactants. The addition of surfactants to release coatings does not usually improve release, and in many cases is detrimental to release. Furthermore, it will be recognized that the quantities desirable for improving release in the present invention are much higher than those quantities normally used in surfactant applications. When used as surfactants, their function is to cause emulsification, lowering of surface tension and the like of aqueous systems, and they are typically used in an amount of about 1%. When they are used in the present invention to improve release characteristics, they are used in a quantity of about 4% to 30% of the coating compound, and as such comprise a substantial part of the coating structure. It should be recognized that some of the above-named materials are commercially obtainable or can be prepared as mixtures of each other and of the same type in varying molecular weights. Such mixtures are within the scope of the invention.

The resulting release sheet is highly useful in panel pressing release applications wherein decorative laminates are consolidated. They provide significantly improved release under a wide variety of conditions. The coating compositions of the invention exhibit excellent stability and pot life. The release sheets prepared therefrom provide very easy release in the pressing of laminates, including laminates of amine formaldehyde resins, under a wide variety of conditions. These release sheets may be reusable, and they permit excellent control over the gloss and surface texture of the laminates being pressed. Additionally, the water dispersible organic compound provides excellent viscosity control over the coating mixture without excessive build up of viscosity. This is believed to be due to the materials having only a few reactive sites even though they are in polymeric form. The present invention is also useful for release coatings upon which are cast urethanes and polyvinyl chloride resins.

DESCRIPTION OF THE PREFERRED EMBODIMENTS

The coating compositions of the invention are aqueous coating compositions comprising a release agent, a cross-linkable thermosetting resin, and a water dispersible organic compound containing polyoxyethylene and/or polyoxypropylene. Illustrative of the types of release agents which have been found useful in the coating compositions of the invention are the Werner type chromium complexes of a fatty acid, such as those sold under the trade name "QUILON" by E. I. duPont de Nemours & Company Inc. of Wilmington, Delaware (e.g., QUILON S-the stearic acid complex, QUILON M or H-the myristic acid complex) and those sold under the tradename "KROMPLEX 75" (a myristic acid chrome chloride complex) by Sun Chemical Co.

Illustrative of the types of cross-linkabe thermosetting resins which are useful in the coating compositions of this invention are ureaformaldehyde resin condensates, melamine-formaldehyde resin condensates, phenolic resins, and the like. Illustrative of the types of monomeric, polyhydric alcohols which are used in the preferred embodiments of the present invention are pentaerythritol, glycerine (glycerol), 1,6 hexanediol, tris-hydroxymethyl nitromethane, tartaric acid (dihydroxysuccinic acid) and the like, alone or in combination with each other.

The amounts of the various components used in the coating compositions of this invention are not narrowly critical, as long as they are sufficient to effectively provide release, and preferably range from about 3 parts by weight (dry) to about 30 parts by weight (dry) of release agent per 100 parts by weight (dry) of coating, from about 5 parts by weight (dry) to about 50 parts by weight (dry) of monomeric polyhydric alcohol per 100 parts by weight (dry) of coating (if the monomeric polyhydric alcohol is to be included), from about 20 parts by weight (dry) to about 60 parts by weight (dry) of cross-linkable thermosetting resin per 100 parts by weight (dry) of coating, and from about 4 parts, preferably 5 or more, by weight (dry) to about 30 parts by weight (dry) of the water dispersible organic compound per 100 parts by weight (dry) of coating.

In addition to the essential components set forth above, the coating compositions of the present invention may also contain other components such as antifoam agents, dyes, colorants, and the like.

Release sheets are prepared from the coating compositions of this invention by coating the composition on a suitable base and then heating the resulting coated base until the release coating thereon has been dried and cured. The principal requirement for the substrate or base to be suitable is that it have a relatively smooth surface which resists substantial penetration of the aqueous coating composition into the base. In the case of a cellulosic fibrous substrate such as paper, this requirement is typically met by providing the paper with a base coating which comprises a mineral pigment (e.g. clay) and adhesive (or binder). In the case of a metal foil, no base coating will be necessary.

The following examples are intended to further illustrate the invention disclosed and claimed herein, but they are not intended to limit the scope thereof. The release coating formulation of each example was coated with a Meyer rod on a 83 lbs. per 3,300 square feet ream base paper sheet that had been previously coated on both sides with 5 lbs. per ream of a conventional clay-binder dispersion and further coated on the side upon which the release coating formulation was to be applied with 8 lbs. per ream of another conventional clay-binder dispersion. In each example except where otherwise indicated, the release coating was applied within 15 minutes after mixing and was dried in a circulating air oven for 1 minute at 150°-160° C. to yield a release coating of approximately 3 lbs. per 3,300 square feet ream.

The general formula for each of the examples was:

| Component | Parts by Weight (Wet) |
| --- | --- |
| Pentaerythritol at 5.6% | 14.3 g. |
| Resimene 735 (an 80% solution in isopropyl alcohol of a methylated melamine-formaldehyde resin condensate sold by Monsanto Company of St. Louis, Missouri) | 6.0 g. |
| Quilon H (a 50% solution in isopropyl alcohol of a Werner-type chromic chloride complex with myristic acid sold by E. I. DuPont de Nemours and Company, Inc. of Wilmington, Delaware) | 2.4 g. |
| isopropyl alcohol | 0.6 g. |
| 2-ethylhexanol | 0.6 g. |
| Additive water soluble organic compound material under test | x |

Each of the coated and dried examples was tested by the following procedure. A 12 by 12 inch platen press at 280° F. and 1200 psi was used for pressing for 10 minutes. The configuration of the stack of materials in the press was, from top to bottom:
1. Hot platen
2. Conventional release sheet, face down
3. 2-phenolic sheets
4. Melamine-formaldehyde pre-preg sheet
5. The release sheet of the example being tested, face up
6. ⅛ inch thick aluminum caul plate
7. ¾ inch thick pressed board After pressing, the consolidated laminates were stripped from the release sheet of the example being tested and rated as follows:

| Release Value | Observed |
| --- | --- |
| A | Perfect peeling-type release |
| B | Sticking in small spots one or more corners |
| C | Corner sticking |
| D | Severe corner sticking extended along edges |
| E | Total edge and corner sticking |
| F | Partial release only in a few spots |
| G | Total bonding, no release whatsoever |

The test procedure was purposely designed to be sufficiently stringent to result in very low ratings for the prior art release sheet (the control) to enable better evaluation of the improved release sheets. Although the control release sheet performed poorly under this test, it is satisfactory for many commercial applications.

| Example No. | Additive Material | Amt. g. (Wet Wt.) | Release Value |
| --- | --- | --- | --- |
| 1. | CONTROL - NO ADDITIVE | — | F |
| 2. | Polyoxyethylene (Polyox WSR-80[1]) mol. wt. = 200,000 | .8 | A |
| 3. | Polyoxyethylene (Polyox WSR N-10[1]) mol. wt. = 100,000 | .8 | A |
| 4. | Polyoxyethylene (Polyox WSR N-10[1]) mol. wt. = 100,000 | 1.6 | A |
| 5. | Polyoxyethylene (Polyox WSR N-10[1]) mol. wt. = 100,000 | 3.2 | A |
| 6. | Polyoxyethylene (POE 200[2]) mol. wt. = 200 | .8 | F |
| 7. | Polyoxyethylene (POE 200[2]) mol. wt. = 200 | 1.6 | D |
| 8. | Polyoxyethylene (Carbowax 600[1]) | .4 | F |

-continued

| Example No. | Additive Material | Amt. g. (Wet Wt.) | Release Value |
|---|---|---|---|
| | mol. wt. = 600 | | |
| 9. | Polyoxyethylene (Carbowax 600[1]) mol. wt. = 600 | .8 | F |
| 10. | Polyoxyethylene (Carbowax 600[1]) mol. wt. = 600 | 1.6 | A-B |
| 11. | Polyoxyethylene (Carbowax 4000[1]) mol. wt. = 4000 | .4 | F |
| 12. | Polyoxyethylene (Carbowax 4000[1]) mol. wt. = 4000 | .8 | A |
| 13. | Polyoxyethylene (Carbowax 4000[1]) mol. wt. = 4000 | 1.6 | A |
| 14. | Polyoxyethylene (Polyox POE 20M[1]) mol. wt. = 20,000 | .4 | A |
| 15. | Polyoxyethylene (Polyox POE 20M[1]) mol. wt. = 20,000 | .8 | A |
| 16. | Tetraethylene glycol, mol. wt. = 176 | .4 | F |
| 17. | Tetraethylene glycol, mol. wt. = 176 | .8 | F |
| 18. | Polyoxyethylenated polyoxypropylene glycol (Pluronic L-35[3]) mol. wt. of PPO = 950, + 20 moles EO | .4 | A |
| 19. | Polyoxyethylenated polyoxypropylene glycol (Pluronic L-35[3]) mol. wt. of PPO = 950, + 20 moles EO | .8 | A |
| 20. | Polyoxyethylenated polyoxypropylene glycol (Pluronic L-31[3]) mol. wt. of PPO = 950, + 3 moles EO | .4 | A |
| 21. | Polyoxyethylenated polyoxypropylene glycol (Pluronic L-31[3]) mol. wt. of PPO = 950, + 3 moles EO | .8 | C |
| 22. | Polyoxyethylenated polyoxypropylene glycol (Pluronic L-31[3]) mol. wt. of PPO = 950, + 3 moles EO | 1.6 | D |
| 23. | Polyoxyethylenated polyoxypropylene glycol (Pluronic F-108[3]) mol. wt. of PPO = 3250, + 300 moles EO | .4 | D |
| 24. | Polyoxyethylenated polyoxypropylene glycol (Pluronic F-108[3]) mol. wt. of PPO = 3250, + 300 moles EO | .8 | A |
| 25. | Polyoxypropylenated polyoxyethylene glycol (Pluronic 10R5[3]) mol. wt. of PPO = 1000, + 23 moles of EO | .4 | B |
| 26. | Polyoxypropylenated polyoxyethylene glycol (Pluronic 10R5[3]) mol. wt. of PPO = 1000, + 23 moles of EO | .8 | A |
| 27. | Polyoxypropylenated polyoxyethylene glycol (Pluronic 17R2[3]) mol. wt. of PPO = 1700, + 10 moles EO | .4 | D |
| 28. | Polyoxypropylenated polyoxyethylene glycol (Pluronic 17R2[3]) mol. wt. of PPO = 1700 + 10 moles EO | .8 | A |
| 29. | Polyoxypropylenated polyoxyethylene glycol (Pluronic 10R8[3]) mol. wt. of PPO = 1000, + 91 moles EO | .4 | E |
| 30. | Polyoxypropylenated polyoxyethylene glycol (Pluronic 10R8[3]) mol. wt. of PPO = 1000, + 91 moles EO | .8 | A |
| 31. | Polyoxypropylenated polyoxyethylene glycol (Pluronic 25R5[3]) mol. wt. 2500 PPO, 57 moles EO | .4 | D |
| 32. | Polyoxypropylenated polyoxyethylene glycol (Pluronic 25R5[3]) mol. wt. 2500 PPO, 57 moles EO | .8 | A |
| 33. | N,N'-Polyoxypropylenated ethylenediamine mol. wt., 2501-3000 + 14-17 moles EO (Tetronic 702[3]) | .4 | D |
| 34. | N,N'-Polyoxypropylenated ethylenediamine mol. wt. 2501-3000 + 14-17 moles EO (Tetronic 702[3]) | .8 | A |
| 35. | N,N'-Polyoxypropylenated ethylenediamine mol. wt. 3501-4000 + 53-61 moles EO (Tetronic 904[3]) | .4 | E |
| 36. | N,N'-Polyoxypropylenated ethylenediamine mol. wt. 3501-4000 + 53-61 moles EO (Tetronic 904[3]) | .8 | A |
| 37. | N,N'-Polyoxypropylenated ethylenediamine mol. wt. | .4 | C |

-continued

| Example No. | Additive Material | Amt. g. (Wet Wt.) | Release Value |
|---|---|---|---|
| | 3501–4000 + 318–363 moles EO (Tetronic 908[3]) | | |
| 38. | N,N'-Polyoxypropylenated ethylenediamine mol. wt. 3501–4000 + 318–363 moles EO (Tetronic 908[3]) | .8 | A |
| 39. | Polyoxypropylene (Polyglycol P-1200[2]) mol. wt. 1200 | .4 | B |
| 40. | Polyoxypropylene (Polyglycol 200[2]) mol. wt. 200 | .8 | F |
| 41. | Polyoxypropylene (Polyglycol 200[2]) mol. wt. 200 | 1.6 | D |
| 42. | Polyoxyethylenated castor oil (Emulphor EL-719[4]) 40 moles EO | .4 | C |
| 43. | Polyoxyethylenated sorbitan monolaurate (Tween 20[5]) 20 moles EO | .4 | A |
| 44. | Polyoxyethylenated sorbitan monolaurate (Tween 20[5]) 20 moles EO | .8 | A |
| 45. | Polyoxyethylenated sorbitan monopalmitate (Tween 40[5]) 20 moles EO | .4 | B |
| 46. | Polyoxyethylenated sorbitan monopalmitate (Tween 40[5]) 20 moles EO | .8 | A |
| 47. | Polyoxyethylenated sorbitan monooleate (Tween 80[5]) 20 moles EO | .4 | A |
| 48. | Polyoxyethylenated sorbitan monooleate (Tween 80[5]) 20 moles EO | .8 | A |
| 49. | Polyoxyethylenated sorbitan monooleate (Tween 81[5]) 5 moles EO | .4 | B |
| 50. | Polyoxyethylenated sorbitan monooleate (Tween 81[5]) 5 moles EO | .8 | A |
| 51. | Polyoxyethylenated sorbitol laurate (G-1045[5]) | .4 | D |
| 52. | Polyoxyethylenated sorbitol laurate (G-1045[5]) | .8 | A-B |
| 53. | Polyoxyethylenated sorbitol-lanolin esters (G-1471[5]) | .4 | B |
| 54. | Polyoxyethylenated sorbitol-lanolin esters (G-1471[5]) | .8 | A |
| 55. | Polyoxyethylenated sorbitol-beeswax ester (G-1726[5]) | .4 | B |
| 56. | Polyoxyethylenated sorbitol-beeswax ester (G-1726[5]) | .8 | B |
| 57. | Polyoxyethylenated polyoxypropylenated stearic acid (G-2162[5]) | .4 | A |
| 58. | Polyoxyethylenated polyoxypropylenated stearic acid (G-2162[5]) | .8 | A |
| 59. | Polyoxyethylenated stearic acid (Myrj 45[5]) 8 moles EO | .4 | B |
| 60. | Polyoxyethylenated stearic acid (Myrj 45[5]) 8 moles EO | .8 | A |
| 61. | Polyoxyethylenated stearic acid (Myrj 52[5]) 40 moles EO | .4 | B |
| 62. | Polyoxyethylenated stearic acid (Myrj 52[5]) 40 moles EO | .8 | A |
| 63. | Polyoxyethylenated nonylphenol (Tergitol NP-14[1]) 4 moles EO | .4 | C |
| 64. | Polyoxyethylenated nonylphenol (Tergitol NP-14[1]) 4 moles EO | .8 | D |
| 65. | Polyoxyethylenated nonylphenol (Tergitol NP-27[1]) 7 moles EO | .4 | D |
| 66. | Polyoxyethylenated nonylphenol (Tergitol NP-27[1]) 7 moles EO | .8 | B |
| 67. | Polyoxyethylenated nonylphenol (Tergitol NP-35[1]) 15 moles EO | .4 | C |
| 68. | Polyoxyethylenated nonylphenol (Tergitol NP-35[1]) 15 moles EO | .8 | A |
| 69. | Polyoxyethylenated nonylphenol (Tergitol NP-40[1]) 20 moles EO | .4 | C |
| 70. | Polyoxyethylenated nonylphenol (Tergitol NP-40[1]) 20 moles EO | .8 | A |

-continued

| Example No. | Additive Material | Amt. g. (Wet Wt.) | Release Value |
|---|---|---|---|
| 71. | Polyoxyethylenated lauryl alcohol (Brij 35[5]) 23 moles EO | .4 | A |
| 72. | Polyoxyethylenated lauryl alcohol (Brij 35[5]) 23 moles EO | .8 | A |
| 73. | Polyoxyethylenated stearyl alcohol (Brij 76[5]) 10 moles EO | .8 | B |
| 74. | Polyoxyethylenated tert-octylphenol (Triton X-100[6]) 9-10 moles EO | .4 | A |
| 75. | Same as Ex. No. 2, except Quilon H was replaced with 3.0 g. of Volan[7] (a chrome complex of methacrylic acid) | .8 | G |
| 76. | Same as Ex. No. 2, except Quilon H was replaced with p-toluene sulfonic acid | .8 | G |
| 77. | Same as Ex. No. 12, except Quilon H was replaced with Quilon S[7] (a 30% solution in isopropyl alcohol of a Werner type chromic chloride complex with stearic acid) | .8 | A |
| 78. | Same as Ex. No. 2, except Resimene 735 was replaced with Cymel 303[8] | .8 | C |
| 79. | Same as Ex. No. 12, except Resimene 735 was replaced with 4.8 g. of Resimene 975[9] (urea formaldehyde resin condensate) | .8 | C |
| 80. | Same as Ex. No. 12, except Resimene 735 was replaced with 4.8 g. of Resimene X980[9] (urea formaldehyde resin condensate) | .8 | A |
| 81. | Same as Ex. No. 2, except 2-ethyl hexanol was replaced with an additional 0.9 g. of isopropyl alcohol | .8 | A |
| 82. | Same as Ex. No. 2, except isopropyl alcohol was replaced with an additional 0.9 g. of 2-ethyl hexanol | .8 | B |
| 83. | Same as Ex. No. 2, except isopropyl and 2-ethyl hexanol were left out | .8 | B |
| 84. | Same as Ex. No. 12, except pentaerythritol was replaced with tris-hydroxymethyl nitromethane | .8 | A |
| 85. | Same as Ex. No. 12, except pentaerythritol was replaced with 1.6 gms. of 1,6 hexanediol | .8 | A |
| 86. | Same as Ex. No. 12, except pentaerythritol was left out | .8 | A |
| 87. | Coating of all Polyox WSR-80[1] |  | G |
| 88. | Same as Ex. No. 1, except Resimene 735 was replaced with Resimene 975[9] | 0 | F |
| 89. | Same as Ex. No. 1, except Resimene 735 was replaced with Resimene X980[9] | 0 | F |
| 90. | Same as Ex. 85, except carbowax 4000 was left out | 0 | F |
| 91. | Same as Ex. No. 2, except Resimene 735 was left out | .8 | G |
| 92. | Same as Ex. No. 20, except coated 2 hours after mixing | .4 | A |
| 93. | Same as Ex. No. 21, except coated 2 hours after mixing | .8 | A |
| 94. | Same as Ex. No. 22, except coated 2 hours after mixing | 1.6 | A |

[1]Manufactured by Union Carbide Corp, of N.Y., N.Y.
[2]Manufactured by Dow Chemical Co. of Midland, Michigan
[3]Manufactured by Wyandotte Chemical Corp. of Wyandotte, Michigan
[4]Manufactured by GAF Corp. of N.Y., N.Y.
[5]Manufactured by Atlas Chemical Industries, Inc. of Wilmington, Delaware
[6]Manufactured by Rohm and Haas Company of Philadelphia, Pennsylvania
[7]Manufactured by E. I. duPont de Nemours & Co. of Wilmington, Delaware
[8]Manufactured by American Cyanamid
[9]Manufactured by Monsanto Company of St. Louis, Missouri From the above examples it can be seen that a wide variety of compounds containing polyoxyethylene and/or polyoxypropylene significantly improve the release values of the release coating described in U.S. Pat. No. 3,946,135. For illustration, compare Example No. 1 (which represents the release coating of U.S. Pat. No. 3,946,145) with Examples Nos. 2-74. As can be seen from the examples, some materials need be used in a larger quantity than others to provide the most improved release, and some of the materials are more effective at lower concentration (see Exs. 43, 47, 57 and 71). Also, it can be seen that higher molecular weights of polyoxyethylene, for example 600 or more, provide a greater improvement to release than lower molecular weights. (See Examples 2-17.) Also, it can be seen that examples of higher molecular weight polyoxypropylene provide greater improvements to release than lower molecular weight examples. However, polyoxypropylene at higher molecular weight becomes water insoluble. Therefore, only a narrow molecular weight range of polyoxypropylene is preferred in the invention, from a molecular weight of about 200 to about 1200, for example. (See Examples 39-41.)

Examples 75-91 illustrate the results from varying other materials in the coating formula. Example 86 indicates the ability to leave out the monomeric polyhydric alcohol of the formula disclosed and claimed in U.S. Pat. No. 3,946,135, when using the additive material of the present invention. Coating formulations of the present invention have varying release characteristics depending upon how long after being mixed they were coated on the paper. Examples 92-94 illustrate the improvement over the coating mixture of examples 20-22 when coating 2 hours after mixing.

While the invention has been particularly shown and described with reference to preferred embodiments thereof, it is understood that a number of variations and modifications will occur to a person skilled in the art without departing from the spirit and scope of the invention as defined in the appended claims.

What is claimed is:

1. A release sheet comprising a substrate having on at least one of its outer surfaces a dried and cured coating composition comprising, in effective amounts for release, a release agent, a cross-linkable thermosetting resin, and a water dispersible organic compound containing polyoxyethylene block having more than 14 repeating units, polyoxypropylene block having more than 4 repeating units; or a block copolymer of polyoxyethylene and polyoxypropylene.

2. The release sheet according to claim 1, wherein said water dispersible organic compound provides from about 4% to about 30% by weight of the coating composition.

3. The release sheet according to claim 2, wherein said release agent is a Werner-type complex of fatty acid with chromic chloride.

4. The release sheet according to claim 2, wherein said coating composition further includes a monomeric polyhydric alcohol.

5. A release sheet comprising a substrate having on at least one of its outer surfaces a dried and cured coating composition comprising, in effective amounts for release, a release agent, a cross-linkable thermosetting resin, and a water dispersible organic compound of either:

A. polyoxyethylenated polyoxypropylenated ethylenediamine; or
B. a compound having the formula:

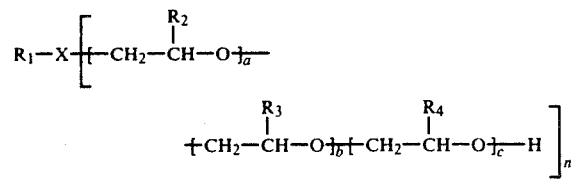

wherein $R_1$ is hydrogen or an organic hydrophobe; $R_2$, $R_3$ and $R_4$ are independently selected from H or $CH_3$—, and where $R_2$, $R_3$ and $R_4$ are all H, more than 50% of the molecular weight of the compound is provided by polyoxyethylene, X is O, S or N, n=1 where X is O or S, n=2 where X is N, and a, b or c are zero or integers, and the sum of a, b and c is greater than 1.

6. The release sheet according to claim 5, wherein said water dispersible organic compound provides from about 4% to about 30% by weight of the coating composition.

7. The release sheet according to claim 6, wherein the release agent is a Werner-type complex of fatty acid with chromic chloride.

8. The release sheet according to claim 7, wherein said coating composition further comprises a monomeric polyhydric alcohol.

9. The release sheet according to claim 8, wherein said water dispersible organic compound provides more than 5% by weight of the coating composition.

10. The release sheet according to claim 5, wherein said water dispersible organic compound is a Class B compound.

11. The release sheet according to claim 10, wherein the water dispersible organic compound is selected from the group consisting of: polyoxyethylene, polyoxypropylene, polyoxyethylenated long-chain carboxylic acid esters of glycerol, polyoxyethylenated long-chain carboxylic acid esters of sorbitol or sorbitan, polyoxyethylenated fatty acids, polyoxyethylenated polyoxypropylenated fatty acids; polyoxyethylenated alkylphenols, polyoxyethylenated alcohols, and polyoxyethylenated polyoxypropylene glycols.

12. The release sheet according to claim 10, in which $R_1$, $R_2$, $R_3$ and $R_4$ are H, and X is O.

13. The release sheet according to claim 12, in which $a+b+c$ is greater than 14.

14. The release sheet according to claim 10, in which $R_1$ is H;

$R_2$, $R_3$, $R_4$ are $CH_3$—; and $a+b+c$ is less than 25.

15. The release sheet according to claim 14, in which $a+b+c$ is greater than 4.

16. The release sheet according to claim 10, in which $R_1$, $R_2$ and $R_4$ is H;

X is O;

$R_3$ is $CH_3$—; and a, b, and c are all integers.

17. The release sheet according to claim 16, in which $300 > a+c > 9$; and $72 > b > 17$.

18. The release sheet according to claim 10, in which $R_1$, $R_3$ are H;

$R_2$, $R_4$ are $CH_3$—;

X is O; and a, b and c are all integers.

19. The release sheet according to claim 18, in which $55 > a+c > 17$; and $250 > b > 4$.

20. The release sheet according to claim 10, in which $R_1$ is an organic hydrophobe.

21. The release sheet according to claim 10 wherein the cross-linkable thermosetting resin is selected from the group consisting of melamine-formaldehyde resin condensates and urea-formaldehyde resin condensates.

22. The release sheet according to claim 1, wherein said coating composition is coated on a paper web having a base coat of pigment and adhesive.

* * * * *